(12) United States Patent
Chin et al.

(10) Patent No.: US 8,594,072 B2
(45) Date of Patent: Nov. 26, 2013

(54) USER EQUIPMENT BASED METHOD TO IMPROVE SYNCHRONIZATION SHIFT COMMAND CONVERGENCE IN TD-SCDMA UPLINK SYNCHRONIZATION

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 12/850,375

(22) Filed: Aug. 4, 2010

(65) Prior Publication Data

US 2011/0243121 A1 Oct. 6, 2011

Related U.S. Application Data

(60) Provisional application No. 61/319,538, filed on Mar. 31, 2010.

(51) Int. Cl.
*H04J 3/06* (2006.01)

(52) U.S. Cl.
USPC .......................... 370/350; 455/502

(58) Field of Classification Search
None
See application file for complete search history.

(56) References Cited

U.S. PATENT DOCUMENTS

| | | | | |
|---|---|---|---|---|
| 6,930,995 B1* | 8/2005 | Heinonen et al. | | 370/350 |
| 6,954,447 B2* | 10/2005 | Grieco et al. | | 370/335 |
| 7,151,944 B2* | 12/2006 | Hashem et al. | | 455/502 |
| 7,154,872 B2* | 12/2006 | Hsuan | | 370/335 |
| 7,443,942 B2* | 10/2008 | Kouyama | | 375/376 |
| 8,081,659 B2* | 12/2011 | Sowinski et al. | | 370/468 |
| 8,243,672 B2* | 8/2012 | Park et al. | | 370/329 |
| 2005/0037786 A1* | 2/2005 | Edge | | 455/502 |
| 2006/0166688 A1 | 7/2006 | Sun et al. | | |
| 2007/0149206 A1* | 6/2007 | Wang et al. | | 455/450 |
| 2009/0141701 A1 | 6/2009 | Dalsgaard | | |
| 2010/0080181 A1* | 4/2010 | Yamada et al. | | 370/329 |
| 2011/0069800 A1 | 3/2011 | Ohta et al. | | |
| 2011/0103499 A1* | 5/2011 | Cheng et al. | | 375/260 |
| 2012/0008600 A1* | 1/2012 | Marinier et al. | | 370/336 |
| 2012/0115539 A1* | 5/2012 | Zhang et al. | | 455/524 |
| 2013/0061105 A1* | 3/2013 | Chun et al. | | 714/748 |

FOREIGN PATENT DOCUMENTS

| | | |
|---|---|---|
| EP | 1871035 A1 | 12/2007 |
| WO | WO2009061256 A1 | 5/2009 |
| WO | WO2009147709 A1 | 12/2009 |

OTHER PUBLICATIONS

International Search Report and Written Opinion—PCT/US2011/030821—ISA/EPO—Jun. 20, 2011.

\* cited by examiner

*Primary Examiner* — Michael J Moore, Jr.
(74) *Attorney, Agent, or Firm* — Kristine U. Ekwueme

(57) ABSTRACT

Certain aspects of the present disclosure propose techniques for improving synchronization shift command convergence in Time Division Synchronous Code Division Multiple Access (TD-SCDMA) uplink synchronization.

24 Claims, 9 Drawing Sheets

| Subframe | UE adjustment | UE UL timing | SS Command |
|---|---|---|---|
| 1 | 0 | 1 | 0 |
| 2 | 0 | 1 | -1 |
| 3 | 0 | 1 | -1 |
| 4 | -1 | 0 | -1 |
| 5 | 0 | 0 | 0 |
| 6 | -1 | -1 | 0 |
| 7 | 0 | -1 | 1 |
| 8 | 1 | 0 | 1 |
| 9 | 0 | 0 | 0 |
| 10 | 1 | 1 | 0 |
| 11 | 0 | 1 | -1 |
| 12 | -1 | 0 | -1 |
| 13 | 0 | 0 | 0 |
| 14 | -1 | -1 | 0 |
| 15 | 0 | -1 | 1 |
| 16 | 1 | 0 | 1 |
| 17 | 0 | 0 | 0 |
| 18 | 1 | 1 | 0 |
| 19 | 0 | 1 | -1 |
| 20 | -1 | 0 | -1 |
| 21 | 0 | 0 | 0 |
| 22 | -1 | -1 | 0 |
| 23 | 0 | -1 | 1 |
| 24 | 1 | 0 | 1 |

FIG. 6

| Subframe | UE adjustment | UE UL timing | SS Command |
| --- | --- | --- | --- |
| 1 | 0 | 1 | 0 |
| 2 | 0 | 1 | -1 |
| 3 | 0 | 1 | -1 |
| 4 | -1 | 0 | -1 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |
| 16 | 0 | 0 | 0 |

FIG. 7

| Subframe | UE adjustment | UE UL timing | SS Command |
|---|---|---|---|
| 1 | 0 | 1 | 0 |
| 2 | 0 | 1 | -1 |
| 3 | -1 | 0 | -1 |
| 4 | -1 | -1 | 0 |
| 5 | 0 | -1 | 1 |
| 6 | 1 | 0 | 1 |
| 7 | 1 | 1 | 0 |
| 8 | 0 | 1 | -1 |
| 9 | -1 | 0 | -1 |
| 10 | -1 | -1 | 0 |
| 11 | 0 | -1 | 1 |
| 12 | 1 | 0 | 1 |
| 13 | 1 | 1 | 0 |
| 14 | 0 | 1 | -1 |
| 15 | -1 | 0 | -1 |
| 16 | -1 | -1 | 0 |

FIG. 8

| Subframe | UE adjustment | UE UL timing | SS Command |
|---|---|---|---|
| 1 | 0 | 1 | 0 |
| 2 | 0 | 1 | -1 |
| 3 | -1 | 0 | -1 |
| 4 | -1 | 0 | 0 |
| 5 | 0 | 0 | 0 |
| 6 | 0 | 0 | 0 |
| 7 | 0 | 0 | 0 |
| 8 | 0 | 0 | 0 |

FIG. 9

USER EQUIPMENT BASED METHOD TO IMPROVE SYNCHRONIZATION SHIFT COMMAND CONVERGENCE IN TD-SCDMA UPLINK SYNCHRONIZATION

CLAIM OF PRIORITY UNDER 35 U.S.C. §119

This application claims the benefit of U.S. Provisional Patent Application No. 61/319,538 entitled: "User Equipment Based Method to Improve Synchronization Shift Command Convergence in TD-SCDMA Uplink Synchronization," filed on Mar. 31, 2010, the disclosure of which is expressly incorporated by reference herein in its entirety.

BACKGROUND

1. Field

Aspects of the present disclosure relate generally to wireless communications, and more particularly, to a method for improving synchronization shift command convergence for Time Division Synchronous Code Division Multiple Access (TD-SCDMA) uplink synchronization.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UTMS), a third generation (3G) mobile phone technology supported by the 3rd Generation Partnership Project (3GPP). The UMTS, which is the successor to Global System for Mobile communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but also to advance and enhance the user experience with mobile communications.

SUMMARY

Certain aspects of the present disclosure provide a method of wireless communication. The method generally includes receiving a plurality of timing adjustment commands, and determining, based on at least one of the plurality of timing adjustment commands, if one of the plurality of timing adjustment commands is suitable to be used by a user equipment (UE) for adjusting transmission timing.

Certain aspects of the present disclosure provide an apparatus for wireless communication. The apparatus generally includes means for receiving a plurality of timing adjustment commands, and means for determining, based on at least one of the plurality of timing adjustment commands, if one of the plurality of timing adjustment commands is suitable to be used by the apparatus for adjusting transmission timing.

Certain aspects of the present disclosure provide a computer program product. The computer program product generally includes a computer-readable medium comprising code for receiving a plurality of timing adjustment commands, and determining, based on at least one of the plurality of timing adjustment commands, if one of the plurality of timing adjustment commands is suitable to be used by a user equipment (UE) for adjusting transmission timing.

Certain aspects of the present disclosure provide an apparatus for wireless communication. The apparatus generally includes at least one processor, and a memory coupled to the at least one processor, wherein the at least one processor is configured to receive a plurality of timing adjustment commands, and determine, based on at least one of the plurality of timing adjustment commands, if one of the plurality of timing adjustment commands is suitable to be used by the apparatus for adjusting transmission timing.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 6 illustrates an example of synchronization shift command oscillations in accordance with certain aspects of the present disclosure.

FIG. 7 illustrates an example of synchronization shift command convergence in accordance with certain aspects of the present disclosure.

FIG. 8 illustrates another example of synchronization shift command oscillations in accordance with certain aspects of the present disclosure.

FIG. 9 illustrates another example of synchronization shift command convergence in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
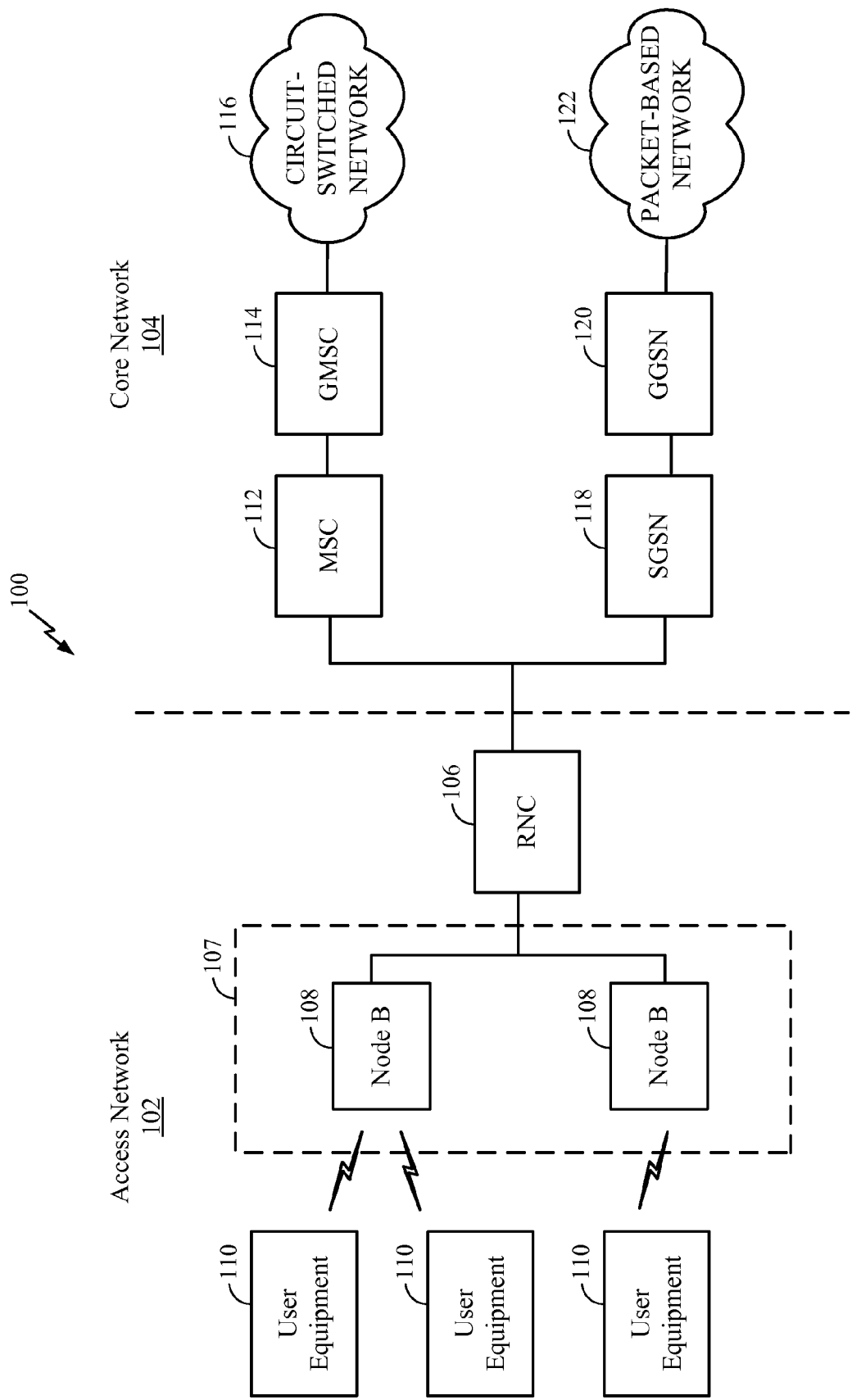
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
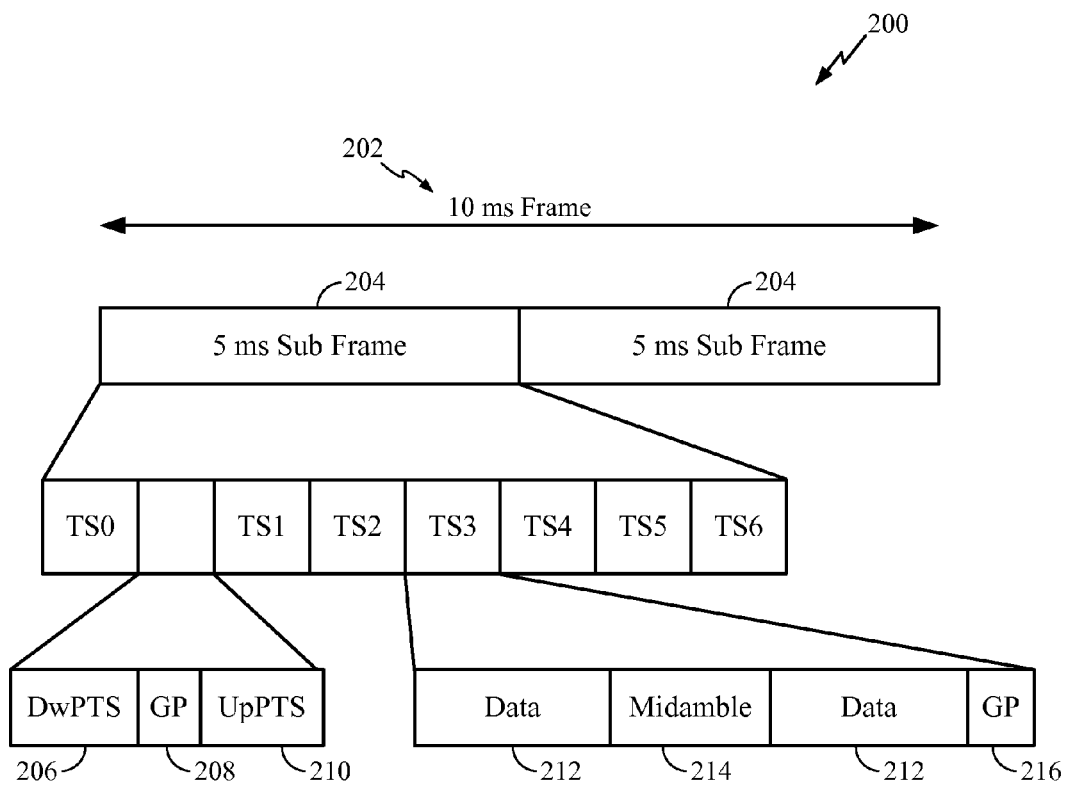
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or the downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
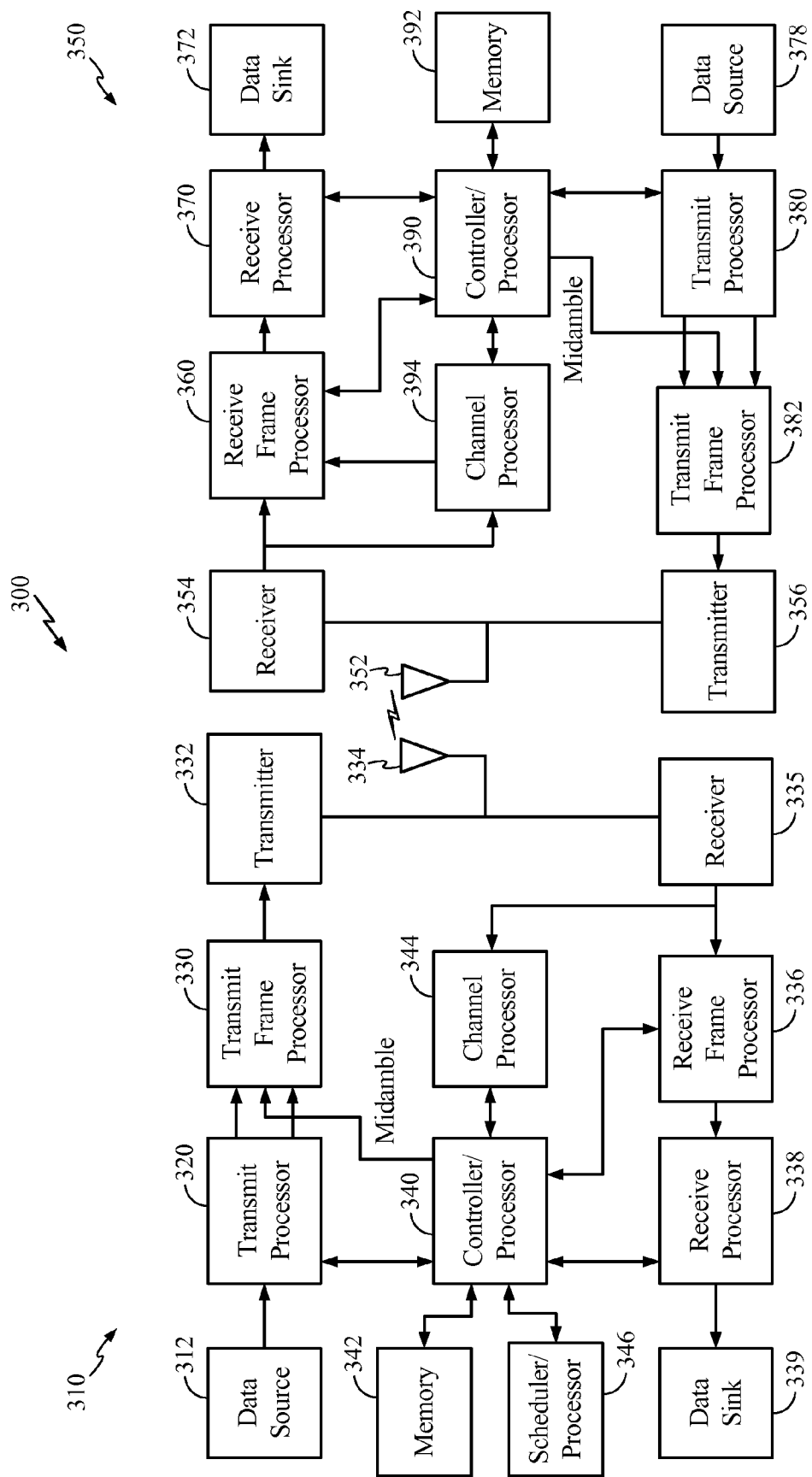
FIG. 3 is a block diagram conceptually illustrating an example of a Node B in communication with a user equipment (UE) in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1.

In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Synchronization Shift Commands Of Td-Scdma Frames

Figure 4:
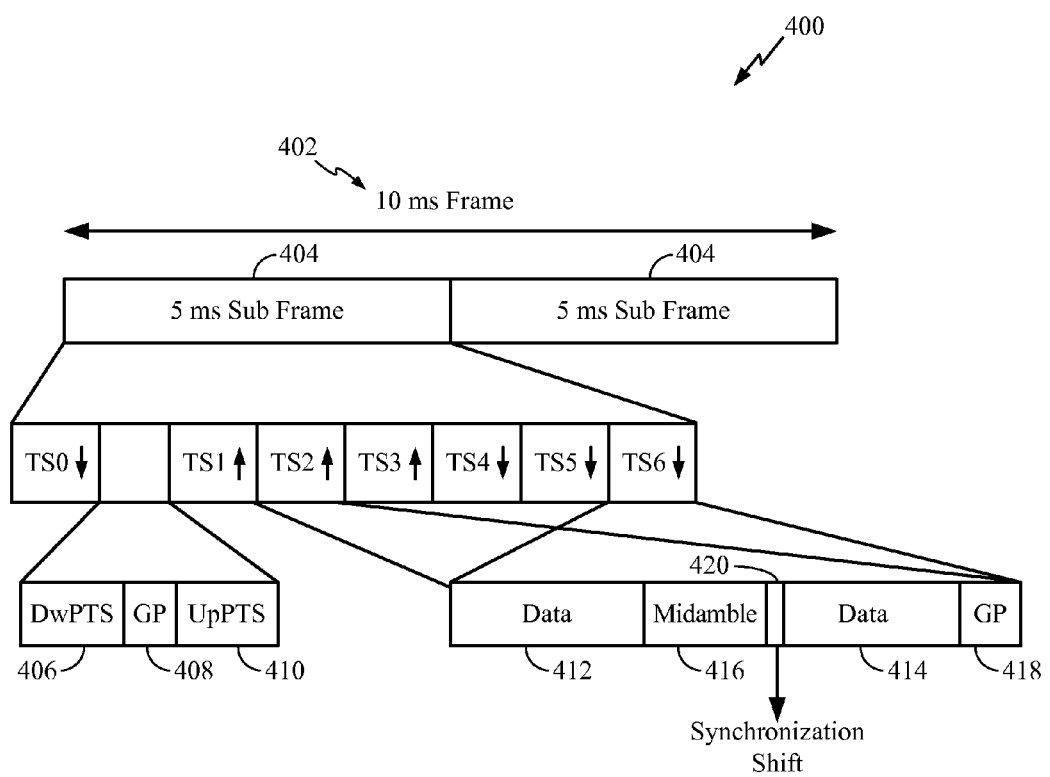
FIG. 4 is a block diagram conceptually illustrating an example of a frame structure with synchronization shift commands in accordance with certain aspects of the present disclosure.

FIG. 4 is a block diagram 400 conceptually illustrating an example of a frame structure 402 with control information for Time Division-Synchronous Code Division Multiple Access (TD-SCDMA) communications in accordance with certain aspects of the present disclosure. The frame 402 may correspond to the frame 202 from FIG. 2 comprising two 5 ms subframes 404, wherein each of the subframes 404 may comprise seven time slots, TS0 through TS6. These time slots may be utilized for either uplink or downlink communications, as illustrated in FIG. 4. A downlink pilot time slot (DwPTS) 406, a guard period (GP) 408, and an uplink pilot time slot (UpPTS) 410 (which may be used to carry the uplink pilot channel (UpPCH)) may be located between time slots TS0 and TS1.

Each downlink or uplink time slot may comprise 16 channelization codes. On each channelization code, the time slot may be structured as two data portions 412 and 414 each of, for example, 352 chips long. These two data portions may be separated by a midamble 416 of, for example, 144 chips, and ending with a guard period 418 of, for example, 16 chips. The transmission rate may be approximately 1.28 Mega chips per second. The data portions 412 and 414 may comprise Layer 1 control information. As illustrated in FIG. 4, a Synchronization Shift (SS) command field 420 may only appear in the second data portion 414 of the time slot.

The SS command bits 420 immediately following the midamble 416 may indicate three possible commands: "up," "down," and "do nothing." When the SS command is "down," then the transmit timing for an uplink time slot may be delayed by one timing adjustment step of k/8 chips. When the SS command is "up," then the transmit timing for the uplink time slot may be advanced by one timing adjustment step of k/8 chips. When the SS command is "do nothing", then the transmit timing for the uplink time slot may not be changed. The value of uplink synchronization step size k (k=1, 2, . . . , 8) may be configured in Radio Resource Control (RRC) messages, such as PHYSICAL CHANNEL RECONFIGURATION, RADIO BEARER RECONFIGURATION and RRC CONNECTION SETUP messages.

The timing adjustment for the uplink transmission may occur in the sub-frame satisfying the following equation:

$$SSFN \text{ modulo } M=0, \quad (1)$$

where SSFN represents the system subframe number. The parameter M represents "uplink synchronization frequency", which may be between 1 to 8 subframes. This parameter may be configured in the RRC messages, such as PHYSICAL CHANNEL RECONFIGURATION, RADIO BEARER RECONFIGURATION and RRC CONNECTION SETUP messages.

A Node B (NB) may continuously measure received uplink (UL) timing from a UE and send necessary SS commands in each sub-frame. In one aspect, the NB may estimate timing of the current UL time slot and transmit an SS command within a downlink (DL) time slot for the UE as soon as the SS command is available. When the UE is allocated with DL/UL DPCH (Dedicated Physical Channel) with a DL time slot immediately following a UL time slot, this may become a very stringent latency constraint for the NB to send the SS command.

Figure 5:
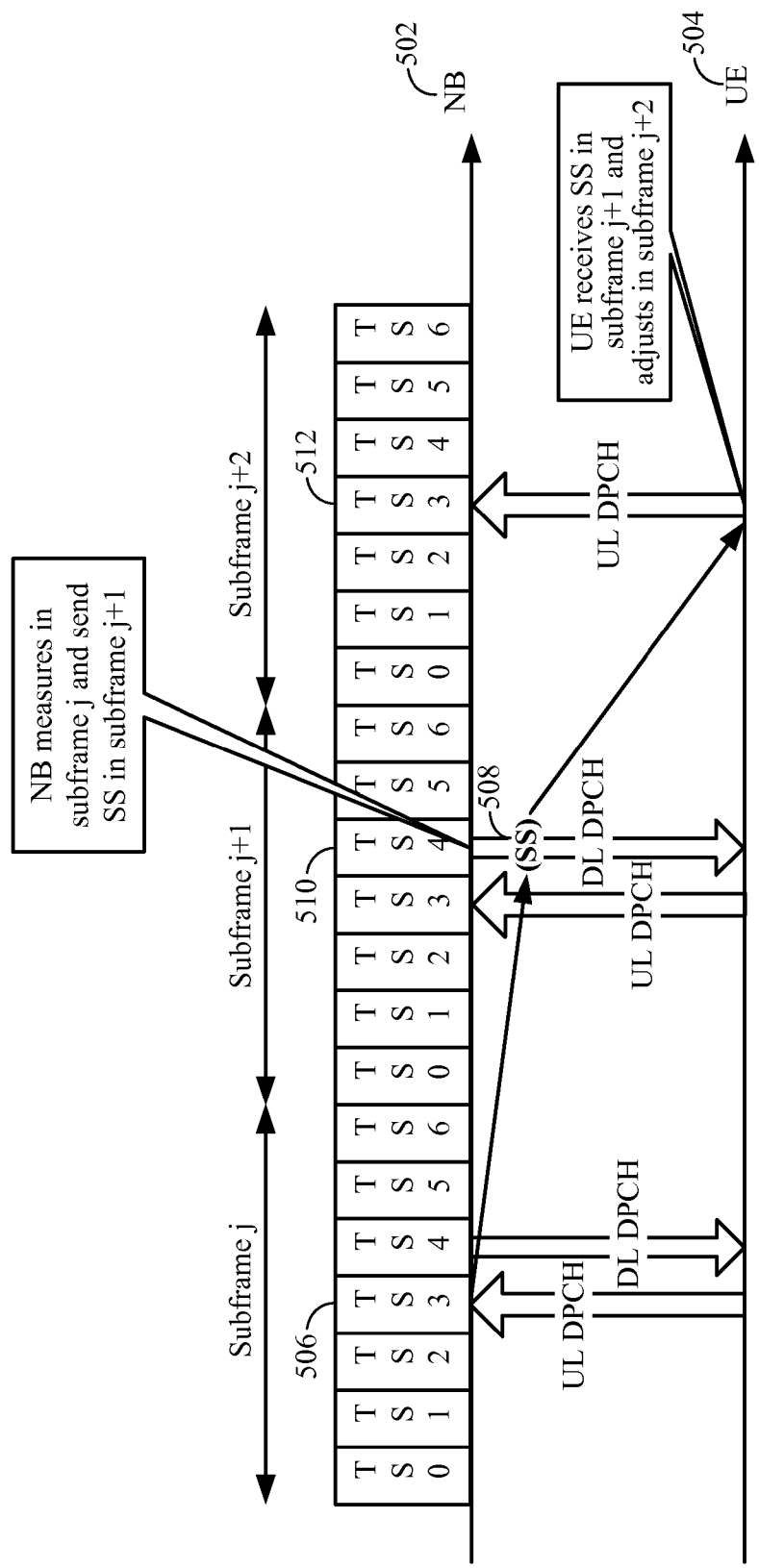
FIG. 5 illustrates an example communication of a synchronization shift command between a Node B and a UE in accordance with certain aspects of the present disclosure.

For example, as illustrated in FIG. 5, a NB 502 may measure UL timing in a subframe j within a UL time slot 506, but it may send an SS command 508 to a UE 504 in a DL time slot 510 of a following subframe j+1. However, the UE 504 may still not be able to adjust the UL timing in the subframe j+1, and may only adjust the UL timing at earliest at a subframe j+2, for example in a UL time slot 512, as illustrated in FIG. 5.

This may result in a potential UL problem of transmission synchronization oscillations. FIG. 6 illustrates an example of synchronization shift (SS) command oscillations if there is at least one unit of k/8 chips to be initially adjusted in the case of uplink synchronization frequency of M=2 subframes. It should be noted that all numbers given in FIG. 6 are in the unit of k/8 chips, and the UE may adjust transmission timing in the unit of k/8 chips.

The UE may be able to adjust the UL timing T at a subframe j=i·M by averaging values of SS commands received in the last M subframes, i.e.

$$T(j+)=T(j)+\text{Round}\{[SS(j-1)+\ldots+SS(j-M)]/M\}, \quad (1)$$

where Round(·) represent the round-off function.

The present disclosure proposes methods and apparatus to address the aforementioned problem of transmission synchronization oscillations so that the UL timing may converge to zero.

Methods To Improve Synchronization Shift Command Convergence For Uplink Synchronization The main cause of the aforementioned UL timing adjustment problem is the delay of sending synchronization shift (SS) commands. For example, in the case of uplink synchronization frequency of M=2 subframes, a UE may adjust the UL timing at a system subframe number 4. The next adjustment may be based on received SS commands at system subframe numbers 4 and 5. However, the SS command received by the UE at the system subframe number 4 may be generated by a NB with timing measurements based on a system subframe number 3, which may occur before the UE adjusted the UL timing at the system subframe number 4. Therefore, this may create the synchronization oscillation problem.

Certain aspects of the present disclosure support a method to improve the convergence of the UL timing adjustment. The case when M>1 can be first considered. The UE may need, for example, to perform UL timing adjustment in a system subframe number j. The UE may receive a plurality of SS commands during system subframe numbers j−1, . . . , j−M:SS(j), . . . , SS(j−M). Then, the UE may calculate a temporary timing adjustment as an arithmetic means of all values of the received SS commands except utilizing SS(j−M) value, i.e.:

$$SS_{temp}=[SS(j)+\ldots+SS(j-M+1)]/(M-1). \quad (2)$$

After that, the UE may check whether the SS command SS(j−M) can be utilized according to the following:

$$SS_{final}=\text{Round}\{SS_{temp}\}, \text{ if } |SS_{temp}-SS(j-M)|>\delta, \quad (3)$$

or $$SS_{final}=\text{Round}\{[SS(j)+\ldots+SS(j-M)]/M\}, \text{ otherwise}, \quad (4)$$

where δ represents a predetermined divergence threshold level.

Therefore, according to equation (3), the UE may be allowed to drop the unneeded SS command (e.g., the first received SS command among the SS commands received in the last M subframes), if its value diverge from other SS commands received in the following M −1 subframes. When applying this approach, convergence of the timing adjustment from FIG. 6 may improve, for example as it is illustrated in FIG. 7.

The case when M=1 can be also considered. In this particular aspect, it may be first required to observe whether the aforementioned synchronization oscillations are present. If the oscillation problem exists, as illustrated in FIG. 8 for the exemplary case of M=1, then the UE may not utilize the existing timing adjustment algorithm given by:

$$T(j+1)=T(j)+SS(j-1). \quad (4)$$

Instead, the UE may use the following timing adjustment algorithm:

$$T(j+1)=T(j-1)+SS(j). \quad (5)$$

By using the transmission timing T(j−1) related to an uplink time slot of a subframe j−1 that does not immediately precedes a current subframe j+1 and an SS command received in a downlink time slot of a subframe j preceding the subframe j+1, the UL timing adjustment may converge, which is illustrated in FIG. 9 for the exemplary case of M=1.

The UE may be able to detect the oscillation problem if alternating SS commands +1, 0, −1 are being successively generated without converging to zero. When the algorithm defined by equation (5) is applied, then the convergence of the UL timing adjustment may improve. If the approach given by equation (5) cannot help the UL timing adjustment to converge to zero, then equation (5) may not be applied and the algorithm defined by equation (4) may be used instead.

Figure 10:
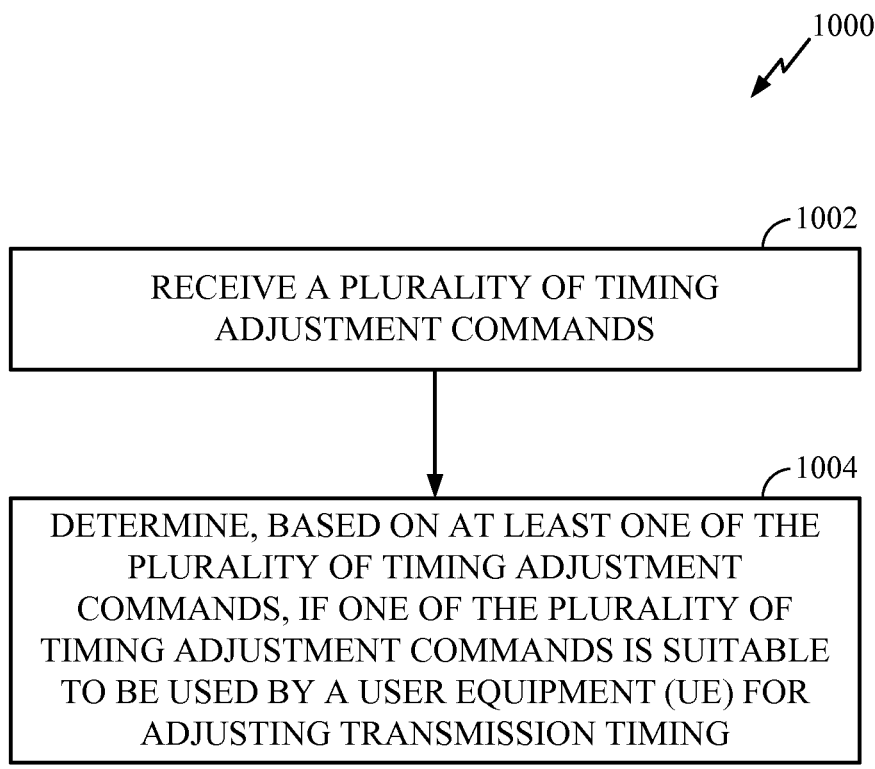
FIG. 10 is a functional block diagram conceptually illustrating example blocks executed at a UE to implement the functional characteristics of one aspect of the present disclosure.

FIG. 10 is a functional block diagram conceptually illustrating example blocks executed at a UE to implement the functional characteristics of one aspect of the present disclosure. Operations illustrated by the blocks 1000 may be executed, for example, by the processors 370 and 380 of the UE 350 from FIG. 3. In block 1002, the UE may receive a plurality of timing adjustment commands. In addition, in block 1004, the UE may determine, based on at least one of the plurality of timing adjustment commands, if one of the plurality of timing adjustment commands is suitable to be used by the UE for adjusting transmission timing.

In one configuration, the apparatus 350 for wireless communication includes means for receiving a plurality of timing adjustment commands, and means for determining, based on at least one of the plurality of timing adjustment commands, if one of the plurality of timing adjustment commands is suitable to be used by the apparatus 350 for adjusting transmission timing. In one aspect, the aforementioned means may be the processors 370 and 380 configured to perform the functions recited by the aforementioned means. In another aspect, the aforementioned means may be a module or any apparatus configured to perform the functions recited by the aforementioned means.

In summary, the present disclosure proposes methods and apparatus to allow the UL transmission timing to converge to a synchronized stage. As a result, the proposed approaches may reduce UL intra-cell interference due to imperfect UL timing and increase UL air interface capacity.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving a plurality of timing adjustment commands; and
   determining, based on at least one of the plurality of timing adjustment commands, if one of the plurality of timing adjustment commands is suitable to be used by a user equipment (UE) for adjusting transmission timing, wherein the determining comprises:
   calculating a temporary adjustment value using the plurality of timing adjustment commands except a first received timing adjustment command among the plurality; and checking if an absolute difference between the temporary adjustment value and a value of the first received timing adjustment command is greater than a threshold level.

2. The method of claim 1, further comprising:
adjusting transmission timing for an uplink time slot based on the temporary adjustment value, if the absolute difference is greater than the threshold level; and
adjusting transmission timing for the uplink time slot based on all timing adjustment commands from the plurality, if the absolute difference is not greater than the threshold level.

3. The method of claim 1, wherein the temporary adjustment value is computed as an arithmetic mean of all values of the plurality of timing adjustment commands except the value of the first received timing adjustment command.

4. The method of claim 1, wherein said determining comprises:
detecting if values of successively received timing adjustment commands from the plurality of timing adjustment commands are alternating without converging to zero.

5. The method of claim 4, wherein receiving the plurality of timing adjustment commands comprises:
receiving, in a downlink time slot of a first subframe, a timing adjustment command, and the method further comprising:
adjusting transmission timing for an uplink time slot of a second subframe immediately following the first subframe based on the received timing adjustment command and on transmission timing for an uplink time slot of a third subframe preceding the first subframe, if the values of successively received timing adjustment commands are alternating.

6. The method of claim 4, wherein receiving the plurality of timing adjustment commands comprises:
receiving, in a downlink time slot of a first subframe immediately following a second subframe, a timing adjustment command, and the method further comprising:
adjusting transmission timing for an uplink time slot of a third subframe immediately following the second subframe based on the received timing adjustment command and on transmission timing for an uplink time slot of the second subframe, if the values of successively received timing adjustment commands are converging to zero.

7. An apparatus for wireless communication, comprising:
means for receiving a plurality of timing adjustment commands; and
means for determining, based on at least one of the plurality of timing adjustment commands, if one of the plurality of timing adjustment commands is suitable to be used by the apparatus for adjusting transmission timing, wherein the means for determining comprises:
means for calculating a temporary adjustment value using the plurality of timing adjustment commands except a first received timing adjustment command among the plurality; and
means for checking if an absolute difference between the temporary adjustment value and a value of the first received timing adjustment command is greater than a threshold level.

8. The apparatus of claim 7, further comprising:
means for adjusting transmission timing for an uplink time slot based on the temporary adjustment value, if the absolute difference is greater than the threshold level; and
means for adjusting transmission timing for the uplink time slot based on all timing adjustment commands from the plurality, if the absolute difference is not greater than the threshold level.

9. The apparatus of claim 7, wherein the temporary adjustment value is computed as an arithmetic mean of all values of the plurality of timing adjustment commands except the value of the first received timing adjustment command.

10. The apparatus of claim 7, wherein the means for determining comprises:
means for detecting if values of successively received timing adjustment commands from the plurality of timing adjustment commands are alternating without converging to zero.

11. The apparatus of claim 10, wherein the means for receiving the plurality of timing adjustment commands is further configured to:
receive, in a downlink time slot of a first subframe, a timing adjustment command, and the apparatus further comprising:
means for adjusting transmission timing for an uplink time slot of a second subframe immediately following the first subframe based on the received timing adjustment command and on transmission timing for an uplink time slot of a third subframe preceding the first subframe, if the values of successively received timing adjustment commands are alternating.

12. The apparatus of claim 10, wherein the means for receiving the plurality of timing adjustment commands is further configured to:
receive, in a downlink time slot of a first subframe immediately following a second subframe, a timing adjustment command, and the apparatus further comprising:
means for adjusting transmission timing for an uplink time slot of a third subframe immediately following the second subframe based on the received timing adjustment command and on transmission timing for an uplink time slot of the second subframe, if the values of successively received timing adjustment commands are converging to zero.

13. A computer program product, comprising:
a non-transitory computer-readable medium comprising code for:
receiving a plurality of timing adjustment commands; and
determining, based on at least one of the plurality of timing adjustment commands, if one of the plurality of timing adjustment commands is suitable to be used by a user equipment (UE) for adjusting transmission timing, wherein said determining comprises:
calculating a temporary adjustment value using the plurality of timing adjustment commands except a first received timing adjustment command among the plurality; and
checking if an absolute difference between the temporary adjustment value and a value of the first received timing adjustment command is greater than a threshold level.

14. The computer program product of claim 13, wherein the non-transitory computer-readable medium further comprising code for:
adjusting transmission timing for an uplink time slot based on the temporary adjustment value, if the absolute difference is greater than the threshold level; and
adjusting transmission timing for the uplink time slot based on all timing adjustment commands from the plurality, if the absolute difference is not greater than the threshold level.

15. The computer program product of claim 13, wherein the temporary adjustment value is computed as an arithmetic mean of all values of the plurality of timing adjustment commands except the value of the first received timing adjustment command.

16. The computer program product of claim 13, wherein said determining comprises:
  detecting if values of successively received timing adjustment commands from the plurality of timing adjustment commands are alternating without converging to zero.

17. The computer program product of claim 16, wherein receiving the plurality of timing adjustment commands comprises:
  receiving, in a downlink time slot of a first subframe, a timing adjustment command, and wherein the computer-readable medium further comprising code for:
    adjusting transmission timing for an uplink time slot of a second subframe immediately following the first subframe based on the received timing adjustment command and on transmission timing for an uplink time slot of a third subframe preceding the first subframe, if the values of successively received timing adjustment commands are alternating.

18. The computer program product of claim 16, wherein receiving the plurality of timing adjustment commands comprises:
  receiving, in a downlink time slot of a first subframe immediately following a second subframe, a timing adjustment command, and wherein the computer-readable medium further comprising code for:
    adjusting transmission timing for an uplink time slot of a third subframe immediately following the second subframe based on the received timing adjustment command and on transmission timing for an uplink time slot of the second subframe, if the values of successively received timing adjustment commands are converging to zero.

19. An apparatus for wireless communication, comprising:
  at least one processor; and
  a memory coupled to the at least one processor,
  wherein the at least one processor is configured to:
    receive a plurality of timing adjustment commands;
    determine, based on at least one of the plurality of timing adjustment commands, if one of the plurality of timing adjustment commands is suitable to be used by the apparatus for adjusting transmission timing; and
    calculate a temporary adjustment value using the plurality of timing adjustment commands except a first received timing adjustment command among the plurality; and
    check if an absolute difference between the temporary adjustment value and a value of the first received timing adjustment command is greater than a threshold level.

20. The apparatus of claim 19, wherein the at least one processor is also configured to:
  adjust transmission timing for an uplink time slot based on the temporary adjustment value, if the absolute difference is greater than the threshold level; and
  adjust transmission timing for the uplink time slot based on all timing adjustment commands from the plurality, if the absolute difference is not greater than the threshold level.

21. The apparatus of claim 19, wherein the temporary adjustment value is computed as an arithmetic mean of all values of the plurality of timing adjustment commands except the value of the first received timing adjustment command.

22. The apparatus of claim 19, wherein the at least one processor is also configured to:
  detect if values of successively received timing adjustment commands from the plurality of timing adjustment commands are alternating without converging to zero.

23. The apparatus of claim 22, wherein the at least one processor is also configured to:
  receive, in a downlink time slot of a first subframe, a timing adjustment command; and
  adjust transmission timing for an uplink time slot of a second subframe immediately following the first subframe based on the received timing adjustment command and on transmission timing for an uplink time slot of a third subframe preceding the first subframe, if the values of successively received timing adjustment commands are alternating.

24. The apparatus of claim 22, wherein the at least one processor is also configured to:
  receive, in a downlink time slot of a first subframe immediately following a second subframe, a timing adjustment command; and
  adjust transmission timing for an uplink time slot of a third subframe immediately following the second subframe based on the received timing adjustment command and on transmission timing for an uplink time slot of the second subframe, if the values of successively received timing adjustment commands are converging to zero.

* * * * *